United States Patent
Hirayama et al.

(10) Patent No.: US 11,750,760 B2
(45) Date of Patent: Sep. 5, 2023

(54) IMAGE FORMING DEVICE, IMAGE PROCESSING METHOD, AND NON-TRANSITORY RECORDING MEDIUM STORING PROGRAM WITH DETERMINING IMAGE PROCESSING METHOD BASED ON IMAGE

(71) Applicant: SHARP KABUSHIKI KAISHA, Sakai (JP)

(72) Inventors: Chiharu Hirayama, Osaka (JP); Daisaku Imaizumi, Osaka (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/138,274

(22) Filed: Dec. 30, 2020

(65) Prior Publication Data
US 2021/0211556 A1 Jul. 8, 2021

(30) Foreign Application Priority Data
Jan. 7, 2020 (JP) .................. 2020-001094

(51) Int. Cl.
*H04N 1/40* (2006.01)
*H04N 1/405* (2006.01)
*H04N 1/60* (2006.01)
*H04N 1/00* (2006.01)

(52) U.S. Cl.
CPC ....... *H04N 1/4052* (2013.01); *H04N 1/00427* (2013.01); *H04N 1/40012* (2013.01); *H04N 1/6027* (2013.01)

(58) Field of Classification Search
CPC combination set(s) only.
See application file for complete search history.

(56) References Cited

U.S. PATENT DOCUMENTS 9,323,725 B2* 4/2016 Kahle ................ H04N 1/40062
9,807,280 B2 10/2017 Misawa et al.
10,855,882 B2* 12/2020 Imaizumi ............... H04N 1/409
(Continued)

FOREIGN PATENT DOCUMENTS

JP 2002-300412 A 10/2002
JP 2007-266921 A 10/2007
(Continued)

*Primary Examiner* — Barbara D Reinier
(74) *Attorney, Agent, or Firm* — ScienBiziP, P.C.

(57) ABSTRACT

An information loss determiner in an image processing device determines whether character collapse has occurred in a simple binarized image. If character collapse has not occurred in the simple binarized image, an image processing determiner selects simple binarization processing as the image processing method of output image data. If character collapse has occurred in the simple binarized image, the process proceeds to photograph area size determination. If the ratio of a photograph area size is less than or equal to a predetermined value, the information loss determiner determines that character collapse has occurred in a posterization processed image. If character collapse has occurred in the posterization processed image, the image processing determiner selects grayscale processing. If character collapse has not occurred in the posterization processed image, the image processing determiner selects posterization processing.

8 Claims, 8 Drawing Sheets

(56) References Cited

U.S. PATENT DOCUMENTS

| | | | | |
|---|---|---|---|---|
| 11,310,378 B2 * | 4/2022 | Takashima | ......... | H04N 1/00424 |
| 2007/0253040 A1 * | 11/2007 | Lee | ....................... | G06V 10/28 |
| | | | | 358/518 |
| 2015/0181077 A1 | 6/2015 | Misawa et al. | | |

FOREIGN PATENT DOCUMENTS

| | | | | | |
|---|---|---|---|---|---|
| JP | 2018-139457 A | | 9/2018 | | |
| JP | 2019106569 A | * | 6/2019 | ............. | G06K 9/344 |
| JP | 2020010163 A | * | 1/2020 | ......... | H04N 1/00005 |

* cited by examiner

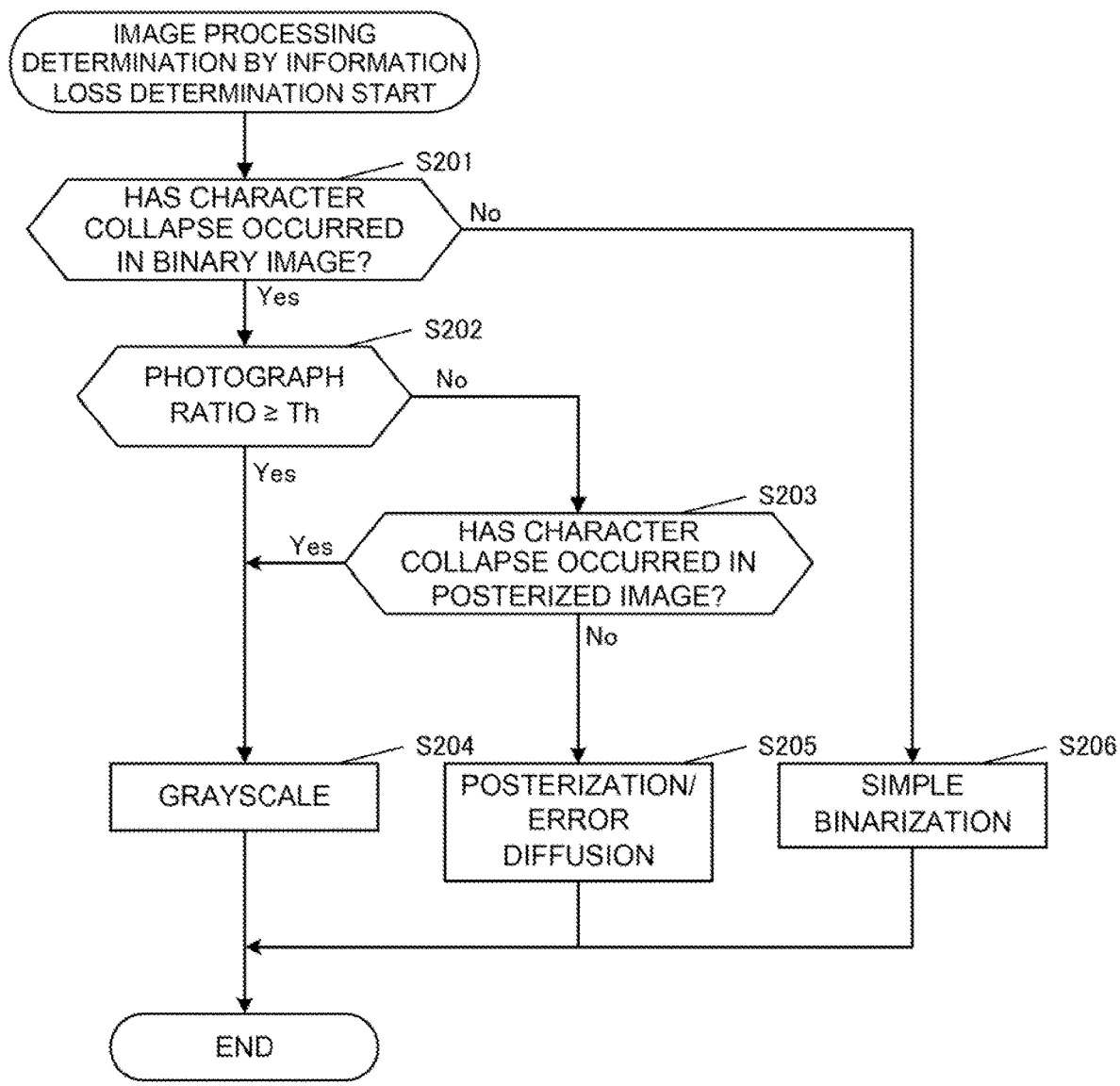

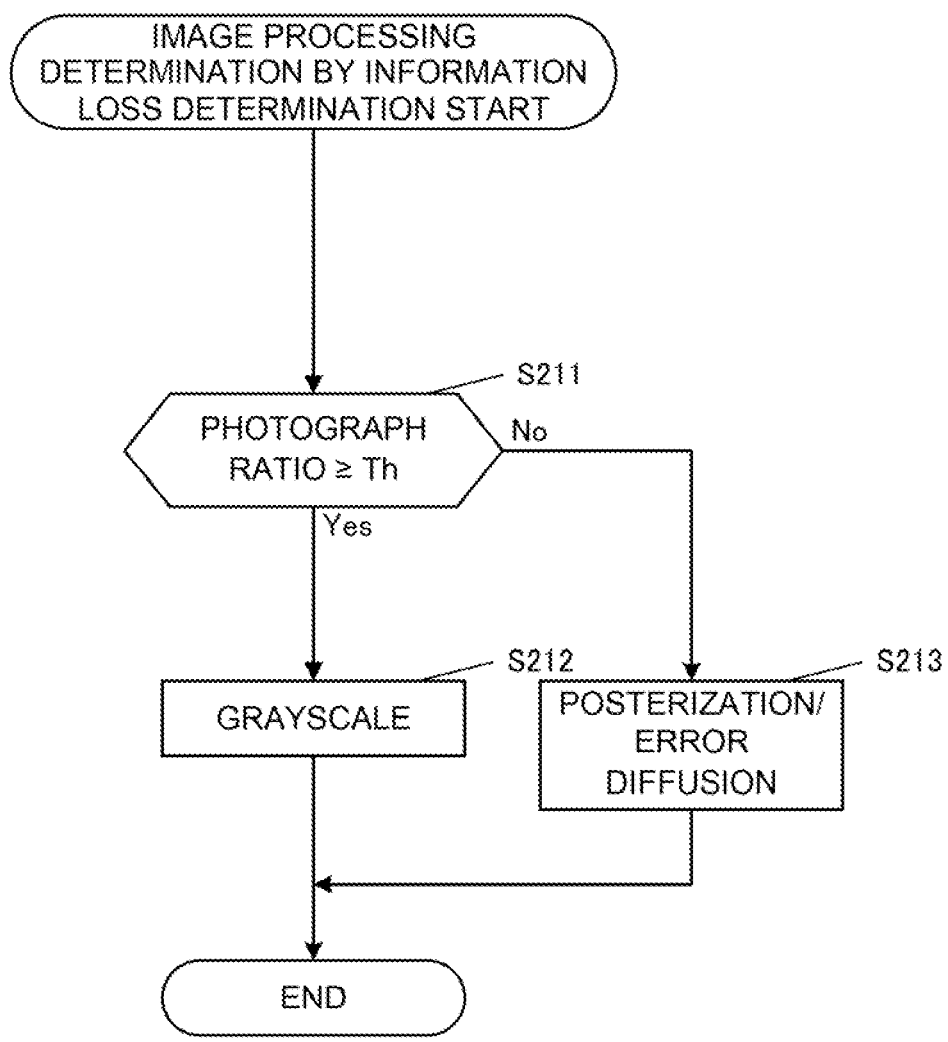

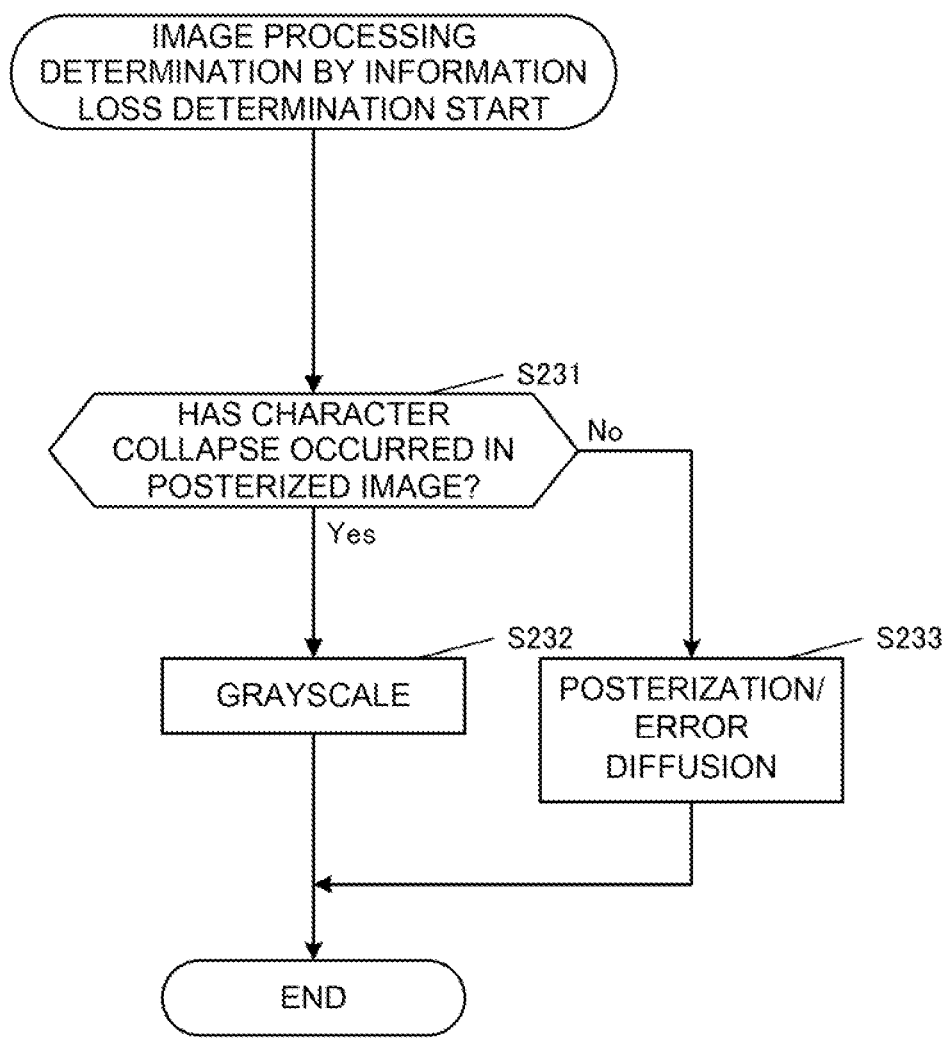

IMAGE FORMING DEVICE, IMAGE PROCESSING METHOD, AND NON-TRANSITORY RECORDING MEDIUM STORING PROGRAM WITH DETERMINING IMAGE PROCESSING METHOD BASED ON IMAGE

BACKGROUND OF THE INVENTION

Field of the Invention

The present invention relates to an image processing device, an image processing method, and a recording medium storing a program that perform processing with respect to an image read by a scanner or the like that reduces the file size as much as possible while suppressing information loss.

Description of the Background Art

In recent years, the spread of digital multifunctional peripherals (MFP: Multifunction Printer) has led not only to the transmission of printed images by fax and the like, but it has also become very common to convert an image on paper into image data in an electronic data format by reading the image with a scanner, and to attach and transmit image data in an electronic data format by email and the like.

Furthermore, MFPs equipped with an automatic sheet feeder (Auto Document Feeder; abbreviated as "ADF" below) for feeding paper to a scanner section for reading documents have recently become widespread. Here, rather than an operation of reading (hereinafter, also referred to as scanning) the document as a document set one page at a time, by starting the scan after setting the plurality of documents to be read together on the ADF, it is possible for the ADF to automatically and consecutively scan the document one page at a time. In this way, an environment is provided in which the burden placed on the user performing the scanning operation is reduced.

However, because the use of an ADF removes the effort of setting a document each time, there is a tendency of the user to not be conscious of the content of the documents, and to set paper in the ADF in a state where images having different properties are mixed in the document set. For example, a case may occur where color image documents and monochrome image documents are mixed in the document set. Furthermore, as another example, a case may occur where text data documents and photograph data documents are mixed in the document set.

Moreover, as the scan processing method, methods that convert a read image into image data of various formats, such as a color image, a grayscale image, or a simple binarized image, are known. As described above, when the documents are a mixture of a variety of documents, and an appropriate scan processing method is not selected for each document, there is a problem that a significant amount of information may be lost, such as the image being filled in and becoming unreadable.

In view of the above circumstances, for example, a technique is known that switches the image processing method by detecting, a property of an image as a classification of the document type, such as whether the image is a color image or a monochrome image, or whether the image is text data or photograph data.

For example, according to Japanese Unexamined Patent Application Publication No. 2007-266921, it is determined first of all whether a read image is a color or monochrome image. Then, if the read image is a monochrome image, the data is processed after determining, based on the purpose of use and layout of the image, whether the image data is to be processed into multi-value grayscale data or binary data.

If a determination is made based on the layout, an analysis of the document layout is performed with respect to the read document image, which is achromatic (monochrome) data, and the ratio of text data to photographic data in the document is examined. Then, depending the ratio, it is determined whether the document is treated as a text document or a photographic document. For example, if photographic data is present in a predetermined ratio or more, the document is determined as being a photographic document. In contrast, if the photographic data is less than a predetermined ratio, the document is determined as being a text document. If a determination is obtained indicating that the document is text data, it is disclosed that the technique switches between grayscale processing and black and white simple binarization processing according to the document type by executing conversion processing of the achromatic color data from grayscale to black and white binary.

SUMMARY OF THE INVENTION

However, in the method of Japanese Unexamined Patent Application Publication No. 2007-266921, it is only determined whether a read image is to be subjected to grayscale processing or black and white simple binarization processing. When simple binarization processing is performed, a significant amount of information may be lost, and a photograph may become unreadable. On the other hand, when the photograph needs to be readable, or when character collapse occurs even with simple binarization, the only choice is to select grayscale processing, which results in the file size becoming very large.

In view of such circumstances, the present invention has an object of providing an image processing device, an image processing method, and a recording medium that stores a program that perform processing with respect to read image data that reduces the file size as much as possible while suppressing information loss.

The present invention is an image processing device that processes input image data and generates output image data, including: an image processor that generates a first evaluation image subjected to grayscale processing, and a second evaluation image subjected to another image processing based on the input image data; an information amount calculator that calculates an information amount which indicates information loss based on a gradation difference value of the second evaluation image with respect to the first evaluation image; an information loss determiner that determines whether or not information loss has occurred based on the information amount; and an image processing determiner that determines an image processing method of the output image data based on a determination result of the information loss determiner; wherein the second evaluation image includes an image processed image having a file size between a grayscale processed image and a simple binarization processed image.

Furthermore, the present invention is an image processing method for processing input image data and generating output image data, the method comprising: generating a first evaluation image subjected to grayscale processing, and a second evaluation image subjected to another image processing based on the input image data; calculating an information amount which indicates information loss based on a gradation difference value of the second evaluation image with respect to the first evaluation image; determining whether or not information loss has occurred based on the information amount; and determining an image processing method of the output image data based on a determination result of the determination of whether or not information loss has occurred; wherein the second evaluation image includes an image processed image having a file size between a grayscale processed image and a simple binarization processed image.

Moreover, the present invention is a recording medium that stores a program for causing a computer to operate the image processing device.

According to the present invention, it is possible to obtain a superior effect in which processing can be performed with respect to read image data that reduces the file size as much as possible while suppressing information loss.

BRIEF DESCRIPTION OF THE DRAWINGS

FIG. 6 is a flowchart showing the image processing determination processing by an information loss determination performed by the image processing device according to the first embodiment.

FIG. 7 is a flowchart showing the image processing determination processing by an information loss determination performed by the image processing device according to a second embodiment.

FIG. 9 is a flowchart showing the image processing determination processing by an information loss determination performed by the image processing device according to a fourth embodiment.

DESCRIPTION OF THE PREFERRED EMBODIMENTS

Hereinafter, embodiments of the present invention will be described in detail with reference to the drawings. In the following description, a configuration in which an image processing device according to the present invention forms part of an image forming device will be illustrated.

First Embodiment

Configuration of Image Forming Device

Figure 1:
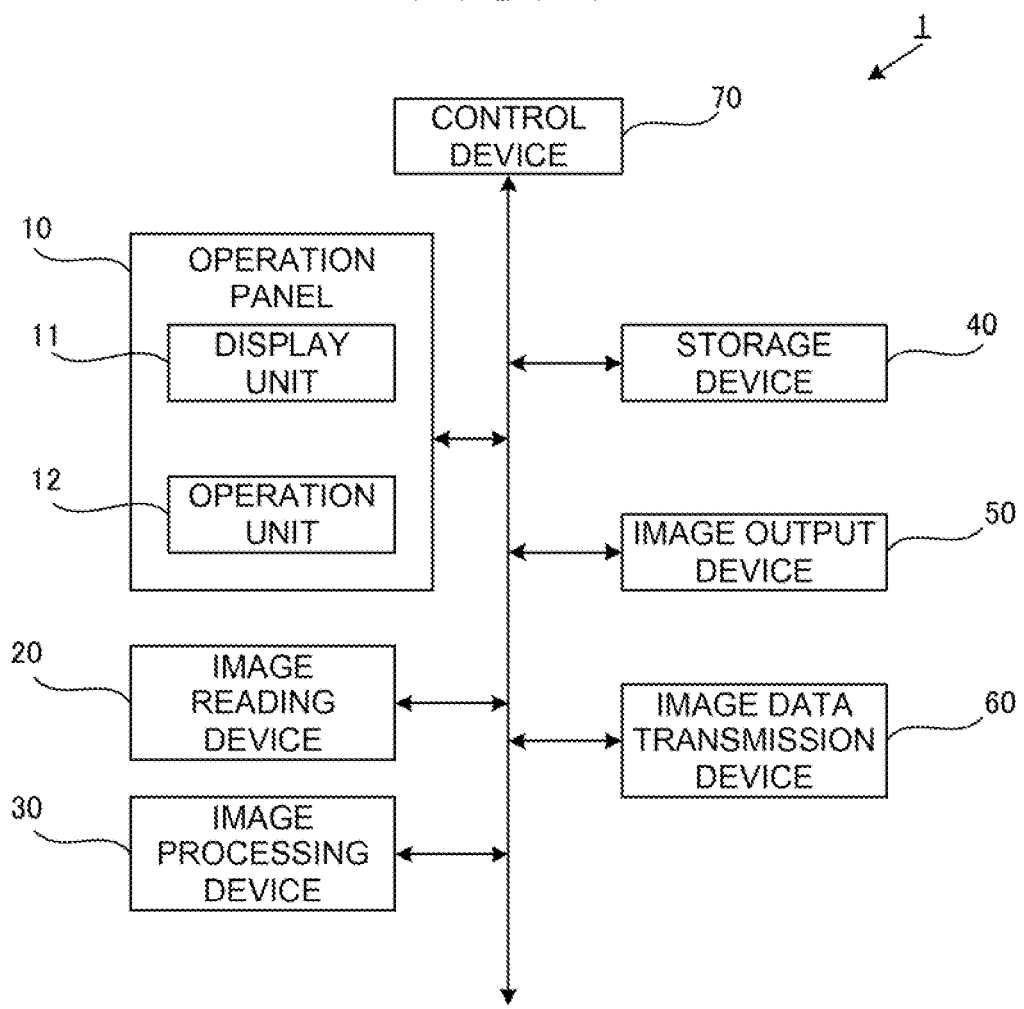
FIG. 1 is a block diagram showing a functional configuration of an image forming device according to a first embodiment.

FIG. 1 is a block diagram showing a functional configuration of an image forming device according to a first embodiment. The image forming device 1 is a digital multifunctional peripheral (MFP) having a copy function, a printing function, a scanner function, and the like. As shown in FIG. 1, the image forming device 1 includes an operation panel 10, an image reading device 20, an image processing device 30, a storage device 40, an image output device 50, an image data transmission device 60, and a control device 70.

The operation panel 10 includes a display unit 11 configured by a liquid crystal display or the like, and an operation unit 12 such as a setting button and a numeric keypad for the user to set an operation mode of the image forming device 1. The operation unit 12 may be realized by a hardware input device such as a switch or a keyboard. It may also be realized by a touch panel or the like which is integrally formed with the display unit 11.

The image reading device 20 optically reads an image from a document. The image reading device 20, for example, comprises a color scanner having a CCD (Charge Coupled Device). A reflected light image from the document is read as an RGB (R: red, G: green, B: blue) or monochrome analog signal using the CCD, which is then output to the image processing device 30. The image reading device 20 does not have to be a scanner, and may be, for example, a digital camera or the like.

The image processing device 30 converts the analog image signal transmitted from the image reading device 20 into digital image data, and generates input image data. Then, various image processing is performed based on the input image data. Finally, output image data is generated and transmitted to the image output device 50.

The input image data does not have to be generated from a signal transmitted from the image reading device 20. It may, for example, be digital image data received from the outside.

When generating the output image data, the image processing device 30 selects image processing that results in the smallest possible file size while suppressing information loss. An information loss determination is performed with respect to character collapse and the photograph area size, and an image processing method is selected based on the result.

The storage device 40 is a data storage device provided with a hard disk or a storage medium such as a solid-state drive (SSD), a flash memory a volatile memory, a non-volatile memory, or a combination of these for temporarily storing the image data handled by the image processing device 30. The storage device 40 is a recording device that records information relating to a plurality of candidates for the number of output gradations, and various other setting information in advance, and also temporarily stores the image data created by image processing calculations during image processing.

The image output device (for example, a printer) 50 prints (forms an image of) an image of the image data transmitted from the image processing device 30 on a recording medium (such as paper or a recording sheet), and examples include a color printer using an electrographic method.

The image data transmission device 60 transmits output image data to the outside via a network. For example, the image data transmission device 60 is capable of using standard email.

The control device 70 is a computer including a processor such as a CPU (central processing unit) or a DSP (digital signal processor), and comprehensively controls the various hardware provided in the image forming device 1. Furthermore, the control device 70 has a function that controls data transfer between the hardware provided in the image forming device 1. In addition, the control device 70 has a function that controls the data communication performed via a network card and a LAN cable (not shown) with computers and other digital multifunctional peripherals connected to the network.

Configuration of Image Processing Device

Figure 2:
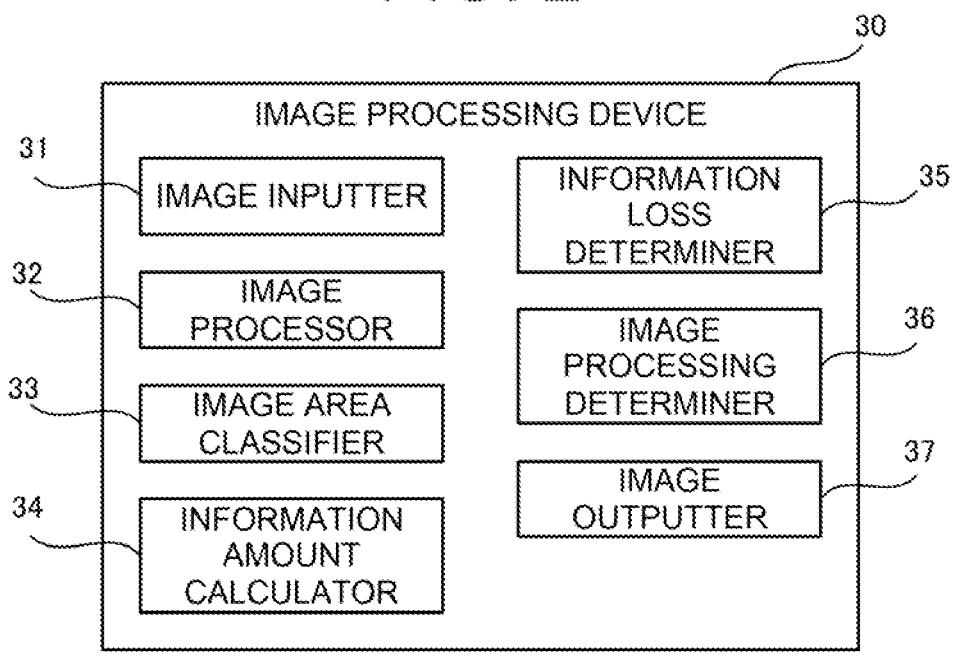
FIG. 2 is a block diagram showing a functional configuration of an image processing device.

FIG. 2 is a block diagram showing a functional configuration of an image processing device. As shown in FIG. 2, the image processing device 30 includes an image inputter 31, an image processor 32, an image area classifier 33, an information amount calculator 34, an information loss determiner 35, an image processing determiner 36, and an image outputter 37.

The image inputter 31 converts an analog signal output by the image reading device 20 to the image processing device 30 into a digital signal, and generates input image data. The image inputter 31 is not limited to the example described above, and may receive image data from the outside, and use the received image data as input image data.

The image processor 32 performs image processing with respect to input image data, and generates image data. In particular, it generates a first evaluation image, which is a reference image necessary for determining information loss of an image, and a second evaluation image for determining whether information loss has occurred relative to the first evaluation image. Furthermore, it generates an output image when the image processing to generate the output image is determined. Specific examples of the image processing include resolution change processing, smoothing processing, sharpening processing, gradation conversion processing such as gamma correction, color/monochrome conversion processing, and conversion processing into image data having a different number of gradations such as a simple binarized image or a multi-gradation image (such as a grayscale image or a posterization image).

The image area classifier 33 classifies the areas in an image into a plurality of attribute areas based on the characteristics of the image data. In the example of the present embodiment, the plurality of attribute areas includes, but is not limited to, character areas, photograph areas, and character-photograph areas in which characters and photographs are mixed.

The information amount calculator 34 calculates a difference value between the gradation in the first evaluation image and the gradation in the second evaluation image as a feature amount of each pixel, and calculates statistical amounts at the block unit level of the image from the feature amounts. Then, the statistical amounts are used as an information amount for performing an information loss determination.

The information loss determiner 35 determines, based on the information amount calculated by the information amount calculator, whether or not the information loss of the image generated by each image processing is greater than or equal to a threshold representing an allowable range.

The image processing determiner 36 determines the optimal image processing method according to the information loss determination result and the file size.

The image outputter 37 outputs the output image data generated by the image processing device 30 in an electronic data format to the outside of the image processing device 30.

Configuration of Information Loss Determiner

Figure 3:
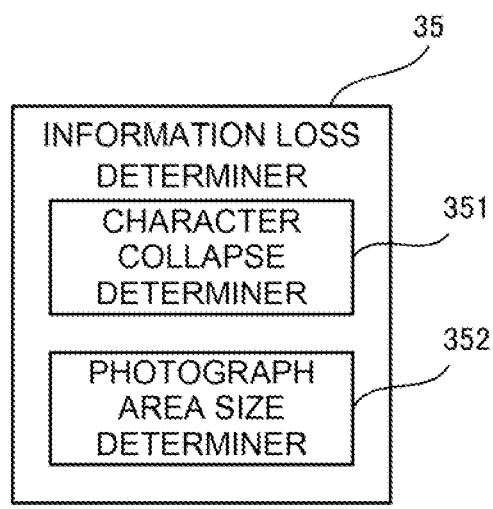
FIG. 3 is a block diagram showing a functional configuration of an information loss determiner.

FIG. 3 is a block diagram showing a functional configuration of an information loss determiner. The information loss determiner 35 includes a character collapse determiner 351 and a photograph area size determiner 352.

The character collapse determiner 351 determines whether or not character collapse has occurred resulting from an information amount. Specifically, if the image quality deteriorates following simple binarization, character collapse refers to a phenomenon where the quality of the edges of the characters deteriorates such that it becomes difficult to read the characters.

The photograph area size determiner 352 calculates, from an extraction result of a photograph area, the ratio of the photograph area size to the entire document, and determines whether or not to set the document as a photograph area.

Main Processing of Image Forming Device

Figure 4:
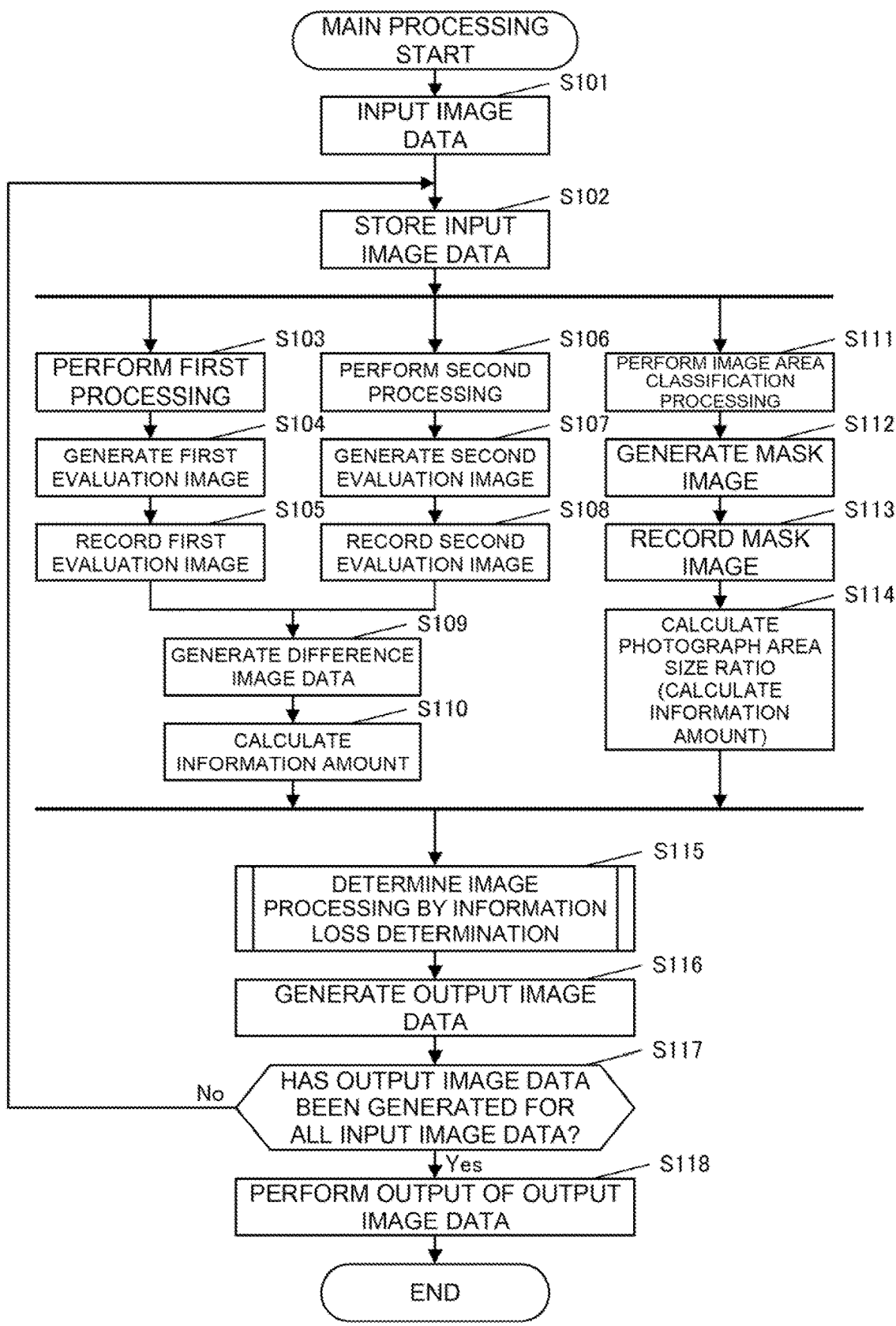
FIG. 4 is a flowchart showing the main processing performed by the image forming device according to the first embodiment.

The flow of the main processing performed by the image forming device 1 of the present embodiment will be described with reference to FIG. 4.

In the present embodiment, it is assumed that the data read by the image reading device 20 has been determined as being a monochrome image by an ACS (Auto Color Select) function of the image forming device 1, and the subsequent processing is to be performed. Note that the image forming device may have a monochrome specification, or data read as a color image may have been converted into a monochrome image.

First, the image reading device 20 optically reads an image drawn on document paper representing the original, and outputs the image as an analog signal to the image processing device 30. Then, the image inputter 31 provided in the image processing device 30 performs input processing of the image data based on the document paper by converting the image data into a digital signal (step S101).

This method is equivalent to that of a typical scanner. The scanning method may be a method in which documents are manually set on the image reading device 20 one at a time, or a method in which a plurality of documents is consecutively read by using a mechanical paper feed function (ADF). In the present embodiment, it is assumed that a method that consecutively reads a plurality of documents set using a mechanical paper feed function is used, and images having different properties, such as text data images and photograph data images, are mixed in the plurality of documents.

The image reading device 20 is equipped with a paper feeding mechanism (ADF), and the plurality of documents that have been set as a result of the paper feeding mechanism are consecutively fed to the image reading device 20 one at a time. Then, the image reading device 20 reads the fed documents one at a time, generates image data for each document, and transmits the image data to the image processing device 30.

The image processing device 30 temporarily stores the image data input via the image inputter 31 in the storage device 40 as input image data (step S102).

1) Processing for Determining Character Collapse

Next, the image processor 32 generates images for evaluating a type of information loss referred to as character collapse, and performs processing that calculates an information amount for determining the information loss (steps S103 to S110).

The first evaluation image is an image that becomes a reference for evaluating the information loss. Here, it is the image obtained after subjecting the input image data to grayscale processing. The second evaluation image is an image for evaluating the information loss relative to the first evaluation image, and is an image obtained after subjecting the input image data to posterization processing, error diffusion processing, simple binarization processing, or the like.

The input image data may not be suitable when setting the appropriate number of gradations because it may have, for example, a resolution that is too high as is, or the contrast may not be appropriate. Therefore, the image processor 32 firstly performs an image correction (first processing) by subjecting the input image data to the following image processing (pre-processing) so that the input image data becomes image data which is suitable for setting the appropriate number of gradations (step S103).

Examples of the image processing performed as pre-processing are listed below.

(1) Resolution Conversion Processing

The input image data may have a resolution which is excessive as is for determining the number of gradations. Therefore, the resolution, that is to say, the size of the image, is converted. Examples of methods that can be used for resolution conversion include methods that are known as image interpolation methods, such as the nearest neighbor method, which uses the values of the nearest pixel as is, and the bilinear method, which calculates the value of each pixel value using weights according to the distance to four peripheral pixels. As a result of the change in resolution, the number of pixels in the first evaluation image becomes smaller than the number of pixels in the original input image data, and the processing load of the subsequent arithmetic processing can be reduced. For example, if the image resolution is 300 dpi at the time of scanning, by converting the resolution so that the image data becomes 150 dpi, the number of pixels in the image data can be reduced to one quarter of the number of the pixels in the original input image.

(2) Contrast Adjustment Processing

In order to adjust the brightness and contrast of the output image on the input side, a lookup table that stores output values in a 1:1 correspondence with input values is used to perform an adjustment with respect to the image obtained after resolution conversion processing, such that the image data takes an output value having the desired characteristics. The image processing may use a method typically referred to as y correction.

(3) Smoothing/Sharpening Processing

The image obtained after contrast adjustment processing is subjected to filter processing suitable for the output image, such as sharpening filter processing, which is for converting an image that gives a blurry impression into a sharp image, or filter processing referred to as a smoothing filter, which contrastingly is for converting an image that gives a coarse impression with edges that exceedingly stand out into a smooth image. The image processing is realized by a spatial filter processor performing a convolution calculation between a target pixel of the image and the surrounding pixels by using a coefficient referred to as a filter kernel.

For example, moving average filters, weighted average filters, and the like are generally known as the spatial filter processing used when performing a convolution calculation. As a result of applying such a filter, a target pixel of the input image takes a pixel value which is averaged with the surrounding pixels around the target pixel. Therefore, smoothing processing is achieved as a result of fluctuations in the pixel values becoming more gradual.

It is a matter for the designer to appropriately select whether to carry out either the smoothing processing or the sharpening processing, to not carry out either type of processing, or to combine both types of processing.

The newly generated image data obtained after subjecting the input image data to image processing (pre-processing) such as (1) to (3) is used as the first evaluation image data (step S104) and recorded in the storage device 40 (step S105). It is possible to omit some of the image processing from (1) to (3), and it is also possible for other known image processing to be further added to these. Moreover, if (1) to (3) are all omitted and the input image data is a grayscale image, this may be used as the first evaluation image data.

Next, the image processor 32 subjects the input image data to a second pre-processing (step S106), generates an image having a smaller number of gradations than the first evaluation image data by performing image processing (such as posterization processing, error diffusion processing, or simple binarization processing), uses the image as the second evaluation image (step S107), and records it in the storage device 40 (step S108).

Next, the information amount calculator 34 generates difference image data based on the first evaluation image and the second evaluation image (step S109). The difference image data is feature amount image data in which the degree of information loss that has occurred between the first evaluation image and the second evaluation image is quantified for each pixel.

As preparation for generating the difference image data, normalization processing (preparation processing) for matching the gradation value ranges of the first evaluation image and the second evaluation image is performed. For example, if the first evaluation image is an 8-bit grayscale image having a minimum gradation value of 0 and a maximum gradation value of 255, and the second evaluation image is a simple binarized image having a minimum gradation value of 0 and a maximum gradation value of 1, the gradation value ranges do not match as is. Therefore, the second evaluation image is multiplied by a predetermined factor (255) so that the maximum value of the second evaluation image is 255, which is the same as that of the first evaluation image. Consequently, the gradation values of the pixels in the first evaluation image and the second evaluation image can be calculated within the same gradation value range.

After the preparation processing, the information amount calculator 34 calculates, for each pixel in the first evaluation image, a difference value of the gradation value of each pixel, which is the difference between each pixel and the corresponding pixel in the second evaluation image. Then, the new image data is generated using the calculated difference values as the gradation value of each pixel. Further, the newly generated image data is recorded in the storage device 40 as difference image data. The number of pixels in the difference image data is the same as the number of pixels in the first evaluation image and the second evaluation image.

Here, the difference value can be made a feature amount that represents the degree of change in the gradation value when a binary image is generated from an image having a plurality of pixel values, that is to say, the magnitude of information loss when the second evaluation image is generated. For example, the absolute value of the difference value between the pixel values at the same pixel position in the original image and the binarized image is calculated for the entire image. Here, the absolute value of the difference value at each pixel position is individually calculated.

The difference value itself can take a positive or negative value. However, when only the magnitude of information loss needs to be considered, the value may be converted into a value of 0 or more by an absolute value calculation, squaring, or the like.

If changes in the image edges (contours) in the image are the focus of the comparison between the first evaluation image and the second evaluation image, an edge image can be generated by applying an edge detection operator for extracting the edges in each image.

Well known edge detection operators include the horizontal direction (x) and vertical direction (y) operators referred to as Prewitt or Sobel operators shown in equation (1) below.

[Equation 1]

$$\text{Prewitt\_x} = \begin{bmatrix} -1 & 0 & 1 \\ -1 & 0 & 1 \\ -1 & 0 & 1 \end{bmatrix}, \quad (1)$$

$$\text{Prewitt\_y} = \begin{bmatrix} -1 & -1 & -1 \\ 0 & 0 & 0 \\ 1 & 1 & 1 \end{bmatrix}$$

A benefit of performing contour extraction processing is that changes in the edge portions of the image can be sensitively detected when determining the change amount described below. For example, if the image data to be processed is image data that contains a high-density character image, even when the ratio of change with respect to the entire image is very small, character collapse occurs and causes the characters to become unreadable when binarization results in a change in the contour shape of the character images. Because the contour extraction processing is particularly effective for sensitively detecting such a phenomenon, a first auxiliary evaluation image and a second auxiliary evaluation image that have been subjected to pre-processing and contour extraction processing are generated with respect to both the first evaluation image mentioned above and the second evaluation image after normalization. Further, by generating a difference image from the first auxiliary evaluation image and the second auxiliary evaluation image, difference image data which is particularly sensitive to changes in the edges of the characters and the like can be generated.

Then, the information amount calculator 34 calculates an information amount (statistical value) for performing the information loss determination (step S110).

Generally, when the information loss is large, there is a tendency for the difference values or the absolute values of the difference values, which are the gradation values of the difference image data, to become larger overall. Therefore, it is possible to use a statistical value that reflects the overall magnitude of the gradation values as the statistical value. Specifically, the sum (total value), average value, median value, or the like of the gradation values of the pixels of the entire difference image data can be used.

Furthermore, when the information loss is large, there is a tendency for the difference values, which are gradation values, or an evaluation value representing the variation in the difference values to become larger overall. The reason for this is that, when the information loss is small, the difference values of each pixel, which are gradation values, or the absolute values of the difference values become values close to 0 for almost all pixels, and the variation becomes small. In contrast, when the information loss is large, many pixels with values other than 0 will be included. Therefore, the variation becomes large. Consequently, a statistical value that reflects the magnitude of the variation in the gradation values can be used as the statistical value. Specifically, a variance value, a standard deviation value, an entropy value, or the like of the gradation values of the pixels of the entire difference image data can be used.

In this manner, the information amount calculator 34 calculates a statistical value with respect to the gradation values of the pixels of the entire difference image data based on an integrated value (total value), an average value, or a median of the gradation values of the pixels of the entire difference image data, or a variance value, a standard deviation value, or an entropy value of the gradation values of the pixels. The way in which the statistical value is calculated may be appropriately selected by the designer, or may be selected by the user.

Here, for example, an entropy value is used as the information amount for determining whether character collapse has occurred in a simple binarized image. The information amount calculator 34 performs blocking of the difference image data, and obtains the entropy from a histogram distribution for each block. The entropy is an index for evaluating trends in a frequency distribution, and can be calculated by the following equation.

Equation 2

$$E = -\sum_{i=0}^{L-1} p(i) \log_2(p(i)) \quad (2)$$

$$\text{Where, } p(i) = \frac{h(i)}{N}$$

Here, L is the number of histogram bins, h(i) is the frequency of each bin, N is the total of the frequencies h(i), and P(i) is the value obtained by normalizing h(i) with N.

Furthermore, for images that have been subjected to posterization processing, blocking is performed with respect to the difference image data, and a difference value is calculated for each block.

2) Processing for Performing Photograph Area Size Determination

At the same time as image generation and information amount calculation processing are being performed for determining whether information loss has occurred in the form of character collapse, processing for calculating the photograph area size is performed (steps S111 to S114). That is to say the ratio of the photograph area in the document is calculated.

First, the image area classifier 33 performs image area classification processing, which classifies the areas in an image into a plurality of areas based on the input image data (step S111). Note that pre-processing as described in the first embodiment may be performed as preliminary preparation for the image area classification processing. The method of the image area classification processing may use, for example, the technique disclosed in Japanese Patent No. 4527127 (hereinafter referred to as "reference document"). According to the technique disclosed in the reference document, a method is disclosed that extracts photograph areas by detecting each of the areas in a document image and then calculating an information amount (entropy). That is to say, because character areas have a large pixel edge intensity, this is used to detect the character areas, and generate a mask using the pixels of the character areas as mask pixels. Then, a masked image is generated, and a histogram is generated based on the masked image. The entropy of the masked histogram is calculated in block units, and blocks that have an entropy value greater than or equal to a predetermined value are determined as being photograph pixels (areas). The details are described in the reference document, so the description will be omitted. The entropy calculation may be performed after performing the pre-processing described above.

The image area classifier 33 generates mask image data, in which the areas in the image are classified as either photograph areas or other areas (in particular, character areas) (step S112). A specific example of the mask image data is image data having the same number of pixels as the first evaluation image and the second evaluation image, and the generated mask image data is recorded in the storage device 40 (step S113).

In the present embodiment, a case will be described in which there are two types of candidates for the number of output gradations, namely an 8-bit grayscale image (number of gradations: 256) and a 1-bit simple binarized image (number of gradations: 2). In the description below, among the candidates for the number of output gradations, the larger number of gradations is referred to as A (256 in the present embodiment), and the smaller number of gradations is referred to as B (2 in the present embodiment).

In the present embodiment, of the candidates for the number of output gradations, based on the value of B, which represents the smaller number of gradations, that is to say, a value of 2, the second evaluation image is generated as a simple binarized image in which the number of gradations is 2. Specifically, a determination is made with respect to each pixel of the first evaluation image of whether the gradation value in the first evaluation image data is greater than or equal to a set threshold or less than the set threshold. Then, if the gradation value in the first evaluation image data is greater than or equal to the set threshold, the gradation value of the pixel is set to "1", which is the gradation value indicating white. If it is less than the set threshold, the gradation value of the pixel is set to "0", which is the gradation value indicating black. As a result, image data is generated which has the same number of pixels as the first evaluation image, and in which all of the pixels have a gradation value of either "0" or "1", that is to say, in which the number of gradations is 2.

As mentioned above, the number of pixels in the second evaluation image is the same as that in the first evaluation image. The pixels of the second evaluation image are, like the pixels of the first evaluation image, target pixels for performing evaluations.

The combination of candidates for the number of output gradations is not limited to the two types described in the present embodiment, namely grayscale processing and simple binarization processing. For example, there may be three or more types of candidates for the image processing of the output image data, and posterization processing and error diffusion processing may also be applied.

Next, the information loss determiner 35 determines whether or not information loss has occurred based on the information amount calculated in step S110 or step S114, and the image processing determiner 36 selects the image processing method of the output image data based on the information loss determination (step S115).

The processing of step S115 will be described later.

The image processor 32 performs the image processing selected by the image processing determiner 36 with respect to the input image data recorded in the storage device 40, and generates image data represented by the set number of output gradations as output image data (step S116). Then, if the image processing device 30 determines that the image processor 32 has not generated output image data for all of the image data that has been input (step S117; No), it performs the processing from step S102 with respect to the unprocessed input image data. If the image processor 32 determines that output image data has been generated (step S117; Yes), the image outputter 37 outputs the output image data to the image output device 50 or the image data transmission device 60, and the image output device 50 prints the data on paper, or the image data transmission device 60 transmits the data to the outside (step S118).

Image Processing Determination Processing by Information Loss Determination

In the first embodiment, it is assumed that a "character focus" setting has been made by the user with respect to the image forming device 1.

Figure 5A:
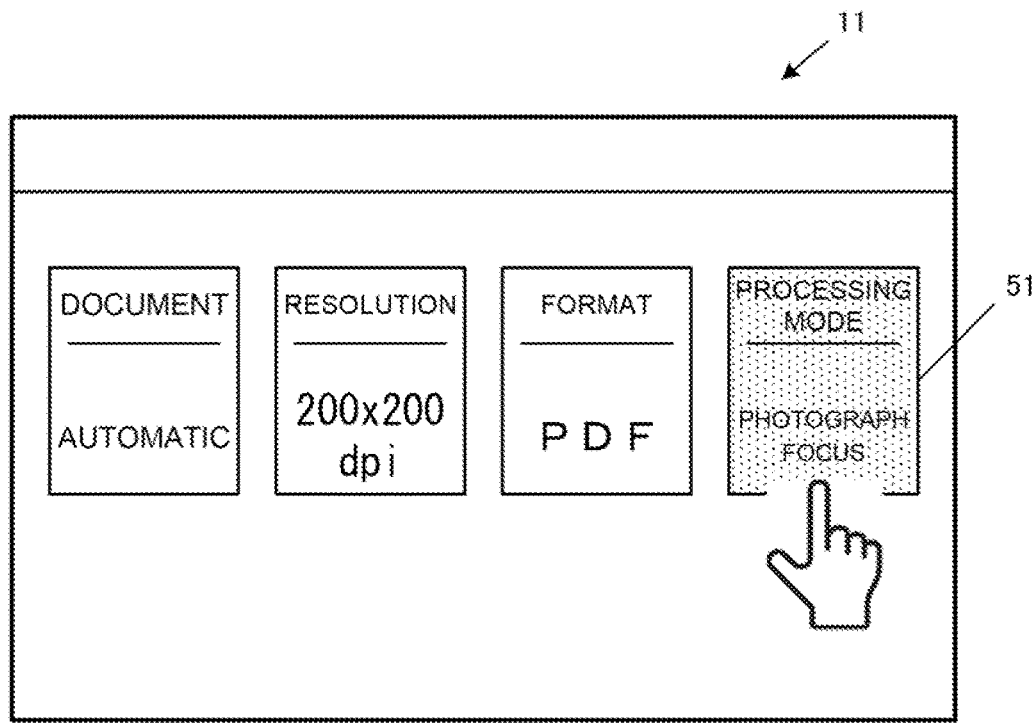
FIG. 5A is an explanatory diagram showing a setting operation screen.
Figure 5B:
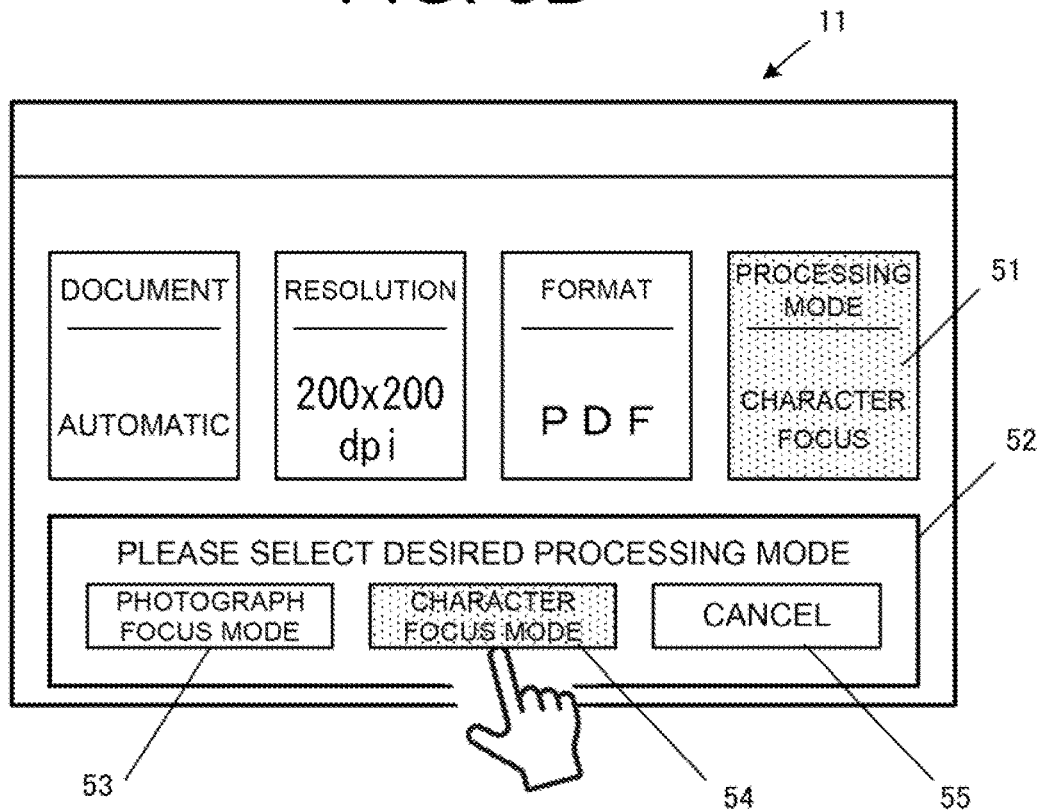
FIG. 5B is an explanatory diagram showing a setting operation screen.

The user performs an operation using the operation unit 12 of the operation panel 10, and displays the setting operation screens shown in FIGS. 5A and 5B on the display unit 11 of the operation panel 10 of the image forming device 1. The text "photograph focus" is displayed on the processing mode switch 51. If "character focus" is already displayed, it can be left as is.

If the user wants to select the character focus mode, touching the processing mode switch 51 (FIG. 5A) displays the processing mode selection area 52 (FIG. 5B). The processing mode selection area 52 displays a "photograph focus mode" switch 53, a "character focus mode" switch 54, and a "cancel" switch 55. When the user touches the "character focus mode" switch 54 of the processing mode selection area 52, "character focus" is displayed on the processing mode switch 51, and the "character focus" setting is set.

As a result of "character focus" being selected by the user, the image processing device 30 performs character focused processing.

The image processing determination processing performed by the information loss determination of step S115 will be described with reference to FIG. 6.

Because the "character focus" setting is set, the image processing device 30 generates a simple binarized image, which has the smallest file size, as the second evaluation image, and calculates an information amount (steps S103 to S110).

The character collapse determiner 351 of the information loss determiner 35 in the image processing device 30 determines whether character collapse has occurred in the simple binarized image (step S201). Because the setting is "character focus", the character collapse determination is performed with respect to a simple binarized image, which has the smallest file size. If the entropy value, which is the information amount, is greater than or equal to 3 or 5, there is a possibility that character collapse may occur. Therefore, an entropy value at which there is a possibility that character collapse may occur is set, and the character collapse determiner 351 counts the number of blocks having an entropy value greater than or equal to the set value, and determines that character collapse has occurred when the count is greater than or equal to a threshold.

At this time, the threshold differs depending on whether the characters are inside a table or outside a table. This is because the effect of ruled lines is considered in the case of characters inside a table.

If character collapse has not occurred in the simple binarized image (step S201; No), the image processing determiner 36 selects simple binarization processing as the image processing method of the output image data (step S206). If character collapse has occurred in the simple binarized image (step S201; Yes), the process proceeds to photograph area size determination (step S202).

If the ratio of the ratio of the photograph area size to the entire document is greater than or equal to a predetermined value (step S202; Yes), the photograph area size determiner 352 determines that the photograph area is large. Here, the predetermined value is, for example, 50%.

When the image processing determiner 36 receives a determination result indicating that the photograph area is large, it selects grayscale processing, which has a high photograph quality, as the processing of the output image (step S204).

If the ratio of the photograph area size is less than or equal to the predetermined value (step S202; No), the photograph area size determiner 352 determines that the photograph area is small.

The image processing device 30 generates a posterization processed image, which has a smaller file size than grayscale processing but a larger file size than a simple binarized image, as the second evaluation image, and calculates an information amount (steps S103 to S110). Note that error diffusion processing can be used instead of posterization processing.

Here, the image processing device 30 calculates an information amount by generating a simple binarization processed or posterization processed image as necessary. However, it is also possible to calculate an information amount by generating images for each processing type at once in advance.

The occurrence of character collapse in the posterization processed image is determined by the character collapse determiner 351 based on the information amount of the posterization processed image (step S203).

If character collapse has occurred in the posterization processed image (step S203; Yes), the image processing determiner 36 selects grayscale processing, which has the highest image quality, as the processing of the output image data (step S204).

If character collapse has not occurred in the posterization processed image (step S203; No), the image processing determiner 36 selects posterization processing, which has a smaller file size than grayscale processing, as the processing of the output image data (step S205).

Although posterization processing, which has a file size between grayscale processing and simple binarization processing, has been used as the image processing, any processing method having a file size between grayscale processing and simple binarization processing that provides an image quality between grayscale processing and simple binarization processing can be used, such as error diffusion processing.

When the character focus mode is set in this manner, because posterization processing, which has a file size and image quality between grayscale processing and simple binarization processing, is selected as the image processing, the file size can be reduced while suppressing information loss.

Second Embodiment

In the second embodiment, the image processing performed when the user selects "photograph focus" (see FIG. 5A) as the processing mode 51 shown on the setting screen will be described.

FIG. 7 is a flowchart showing the image processing determination processing by an information loss determination performed by an image processing device according to the second embodiment. Because the photograph focus mode is set, processing is performed with respect to a posterization processed image, which has a higher image quality than a simple binarization processed image but a smaller file size than a grayscale processed image, rather than a simple binarization processed image having the most inferior image quality.

If the photograph area size determiner 352 of the information loss determiner 35 determines that the ratio of the photograph area is greater than or equal to a predetermined value (step S211; Yes), the image processing determiner 36 selects grayscale processing as the image processing of the output image data (step S212).

If the photograph area size determiner 352 of the information loss determiner 35 determines that the ratio of the photograph area size to the entire document image is smaller than a predetermined value (step S211; No), the image processing determiner 36 selects posterization processing as the image processing of the output image data (step S213).

Although posterization processing, which has a file size between grayscale processing and simple binarization processing, has been used as the image processing, any processing method having a file size between grayscale processing and simple binarization processing that provides an image quality between grayscale processing and simple binarization processing can be used, such as error diffusion processing.

As described above, in the case of the photograph focus mode, by applying posterization processing (or error diffusion processing) with respect to an image having a low photograph area ratio, the file size can be reduced without excessively reducing the image quality.

Third Embodiment

In the third embodiment, the image processing performed when the user selects "character focus" as the processing mode 51 shown on the setting screen illustrated in FIG. 5B will be described.

Figure 8:
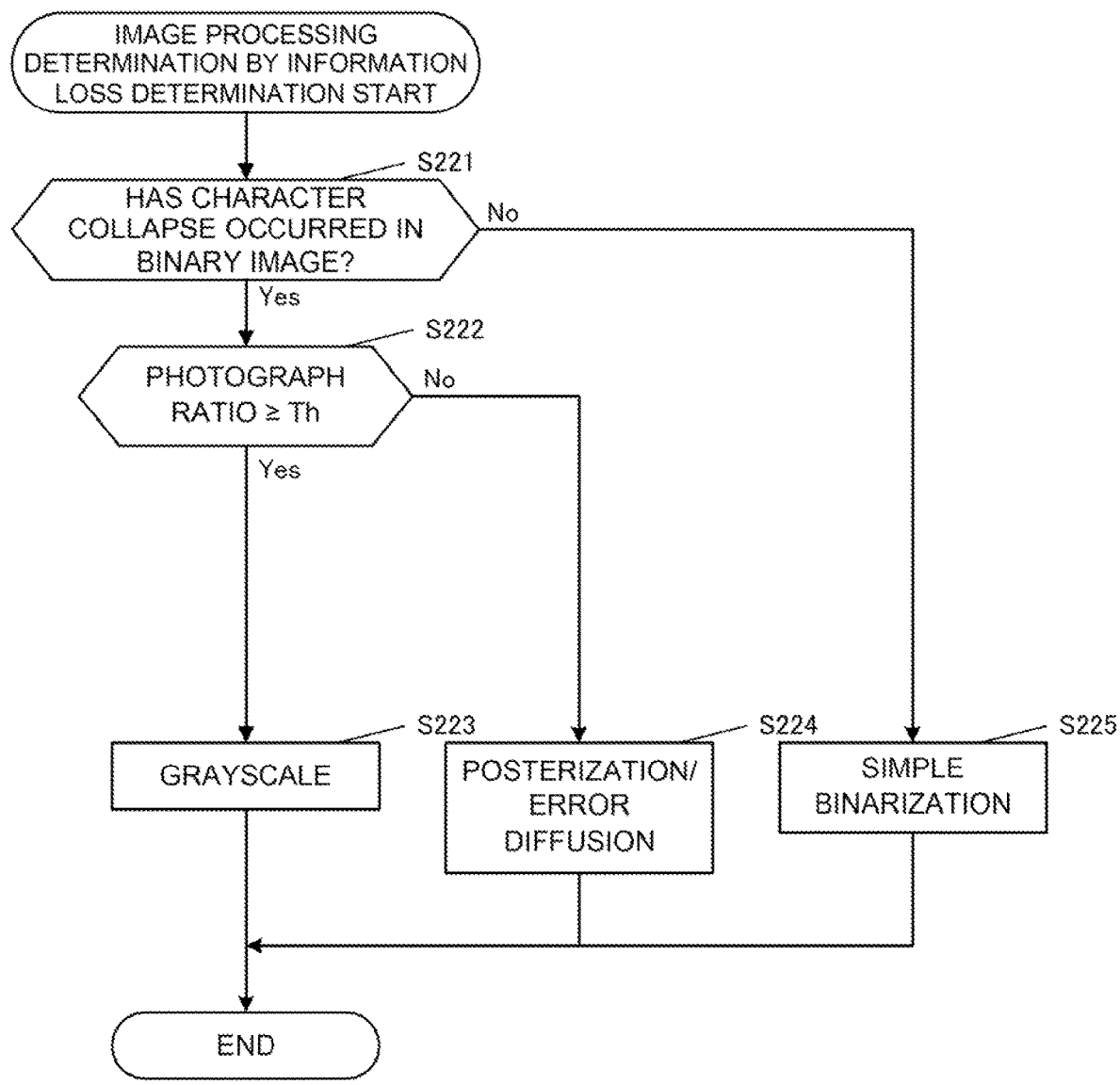
FIG. 8 is a flowchart showing the image processing determination processing by an information loss determination performed by the image processing device according to a third embodiment.

FIG. 8 is a flowchart showing the image processing determination processing by an information loss determination performed by the image processing device according to the third embodiment. This omits from the flowchart of FIG. 6 the processing that determines whether character collapse has occurred in the posterization processed image (step S203). Because a posterization processed image (or error diffusion processed image) has an enhanced image quality compared to a simple binarized image, by simplifying the processing that determines the use of a grayscale image, an image processing determination can be performed in which the file size is less likely to increase than in the flowchart of FIG. 6.

The effect of the processing is the same as that of the first embodiment.

Fourth Embodiment

FIG. 9 is a flowchart showing the image processing determination processing by an information loss determination performed by the image processing device according to a fourth embodiment. The fourth embodiment illustrates the image processing performed when the user selects "character focus" as the processing mode 51 shown on the setting screen illustrated in FIG. 5B, but is processing performed when a certain degree of photographic image quality is required, and therefore, excludes simple binarization processing. For example, although not illustrated, a setting that excludes simple binarization processing on the setting screen can be considered.

The character collapse determiner 351 of the information loss determiner 35 in the image processing device 30 determines whether or not character collapse has occurred based on an information amount of the posterization processed image. If character collapse has not occurred in the posterization processed image (step S231; No), the image processing determiner 36 selects posterization processing as the image processing of the output image data (step S233). If character collapse has occurred in the posterization processed image (step S231; Yes), grayscale processing is selected as the processing of the output image data (step S232).

Although posterization processing, which has a file size between grayscale processing and simple binarization processing, has been used as the image processing, any processing method having a file size between grayscale processing and simple binarization processing that provides an image quality between grayscale processing and simple binarization processing can be used, such as error diffusion processing.

As described above, although the character focus mode has been used, simple binarization processing, which has the most inferior image quality, is avoided. Therefore, processing can be performed that reduces the file size while suppressing deterioration of the image quality, including that of the photograph areas.

Modifications

Although a color multifunction peripheral has been described above, a monochrome multifunction peripheral may also be used. In the present invention, a computer-readable recording medium that records a program to be executed by a computer may record a processing method that causes the image processing device described above to take an image containing a target that has been captured with a background as input, and extracts image data of only a target area.

As a result, a recording medium on which a program code (an executable program, an intermediate code program, or a source program) that performs the processing described above can be provided in a portable fashion. In the present embodiment, the recording medium may be a memory (not shown) for causing a microcomputer to perform processing, such as ROM that serves as the program medium itself. Furthermore, a program reading device may be provided as an external storage device (not shown), and the program medium may be read by inserting it into the program reading device.

In each case, a configuration is possible in which the stored program is accessed and executed by a microprocessor. Alternatively, in each case, a format is possible in which the program code is read, the read program code is downloaded to a program storage area (not shown) of the microcomputer, and the program is then executed. A program for performing the download is assumed to have been stored in the main unit device in advance. Here, the program medium mentioned above is a recording medium configured to be separable from the main unit, and may be a medium that fixedly stores the program code, including a tape system such as a magnetic tape or a cassette tape, a magnetic disk system such as a flexible disk or a hard disk, an optical disk system such as a CD-ROM/MO/MD/DVD, a card system such as an IC card including a memory card)/optical card, or a semiconductor memory such as a mask ROM, an EPROM (erasable programmable read only memory), an EEPROM (electrically erasable programmable read only memory), or a flash ROM.

Furthermore, because the present embodiment has a system configuration which is capable of connecting to a communication network including the Internet, it is possible to use a medium that dynamically stores the program code such that the program code is downloaded from the communication network. If the program is downloaded from the communication network in this manner, the program for performing the download may be stored on the main unit device in advance, or may be installed from a separate recording medium. The present invention can also be realized in the form of a computer data signal embedded in a carrier wave, in which the program code described above is embodied by an electronic transmission.

The image processing method described above is executed as a result of the recording medium being read by a program reading device provided in the image processing device.

What is claimed is:

1. An image processing method, comprising:
   generating a first evaluation image subjected to grayscale processing as a first image processing with respect to an input image data, and a second evaluation image subjected to image processing to generate an image having a smaller number of gradations than the first evaluation image as a second image processing with respect to the input image data;
   calculating statistical amounts, in block units, for each pixel in a block of the input image data based on a gradation difference value between gradation values of the first evaluation image and the second evaluation image;
   generating an output image data from the input image data by performing the second image processing with respect to the input image data if the number of blocks having the statistical amounts greater than or equal to a set value is less than a threshold; and
   outputting the output image data by printing on paper or transmitting outside an image processing device that performs the image processing method,
   wherein
   the second evaluation image includes a processed image having a file size between a grayscale processed image and a simple binarization processed image.

2. The image processing method according to claim 1, further comprising determining whether or not a ratio of a photograph area to an entirety of the input image data is greater than or equal to a predetermined value.

3. The image processing method according to claim 2, wherein
   the second evaluation image is a posterization processed image or an error diffusion processed image, and
   the method further comprises determining posterization processing or error diffusion processing as an image processing method of the output image data if the ratio is less than the predetermined value.

4. The image processing method according to claim 1, further comprising determining whether or not character collapse has occurred in the second evaluation image.

5. The image processing method according to claim 1, further comprising:
   determining whether or not character collapse has occurred in the second evaluation image; and
   determining whether or not a ratio of a photograph area to an entirety of the input image data is greater than or equal to a predetermined value.

6. The image processing method according to claim 1, wherein
   the statistical amounts are values that reflect an overall magnitude of gradation values or values that reflect a magnitude of variations in the gradation values.

7. The image processing method according to claim 6, wherein
the statistical amounts are each an entropy value.

8. The image processing method according to claim 1, wherein
if the number of blocks having the statistical amounts greater than or equal to the set value is greater than or equal to the threshold, the output image data is generated by performing the first image processing with respect to the input image data instead of performing the second image processing with respect to the input image data.

* * * * *